United States Patent
Ueno et al.

(10) Patent No.: US 6,671,269 B1
(45) Date of Patent: Dec. 30, 2003

(54) RADIO COMMUNICATION METHOD AND RADIO COMMUNICATION APPARATUS

(75) Inventors: Masatoshi Ueno, Tokyo (JP); Keitaro Kondou, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/505,703

(22) Filed: Feb. 17, 2000

(30) Foreign Application Priority Data

Feb. 19, 1999 (JP) .......................................... 11-041842

(51) Int. Cl.[7] .............................. H04J 3/00; H04J 3/24; H04L 12/43; H04B 7/212
(52) U.S. Cl. ........................ 370/345; 370/473; 370/458; 370/347
(58) Field of Search ................................ 370/473, 474, 370/477, 458, 442, 394, 310.1, 314, 336, 337, 345, 347

(56) References Cited

U.S. PATENT DOCUMENTS

| | | | | |
|---|---|---|---|---|
| 5,748,624 A | * | 5/1998 | Kondo | 370/347 |
| 6,014,385 A | * | 1/2000 | Ayanoglu et al. | 370/458 |
| 6,016,311 A | * | 1/2000 | Gilbert et al. | 370/280 |
| 6,240,079 B1 | * | 5/2001 | Hamalainen et al. | 370/337 |
| 6,504,853 B1 | * | 1/2003 | Lindgren et al. | 370/468 |

* cited by examiner

Primary Examiner—Hassan Kizou
Assistant Examiner—Timothy Lee
(74) Attorney, Agent, or Firm—Jay H. Maioli

(57) ABSTRACT

In a radio communication method and a apparatus in which a fixed-length data block is transferred between respective nodes by using a predetermined time slot of a plurality of time slots provided within each consecutive cycle, a transmission efficiency can be improved. The control node manages the transmission of isochronous communication data of each node at the unit of one cycle or a plurality of cycles. The unit information is transmitted to the control node by each node, and each node calculates a total data length of isochronous communication data transmitted within one cycle. A remainder is calculated by dividing this total data length with a data length of data block the unit information is obtained by using this remainder (S13 to S18), and this unit information is reported to the control node (S19). Since the control node manages the transmission of isochronous communication data of each node at the unit of one cycle or a plurality of cycles, the portion in which the data blocks useless can be reduced, thereby making it become possible to improve a transmission efficiency.

2 Claims, 12 Drawing Sheets

| QPSK | 4 | 48 | 8 |
|---|---|---|---|
| 16QAM | 4 | 100 | 16 |
| 256QAM | 4 BYTES | 204 BYTES | 32 BYTES |
| | HEADER | USER DATA (IEEE1394) | PARITY |

FIG. 6A

| PACKET ID | SOURCE | DATA LENGTH | KINDS OF DATA | DIVIDE INFORMATION | RESERVE |
|---|---|---|---|---|---|

FIG. 6B

| HEADER | USER DATA | HEADER | USER DATA | PARITY |
|---|---|---|---|---|

FIG. 6C

| HEADER | USER DATA | NULL DATA | PARITY |
|---|---|---|---|

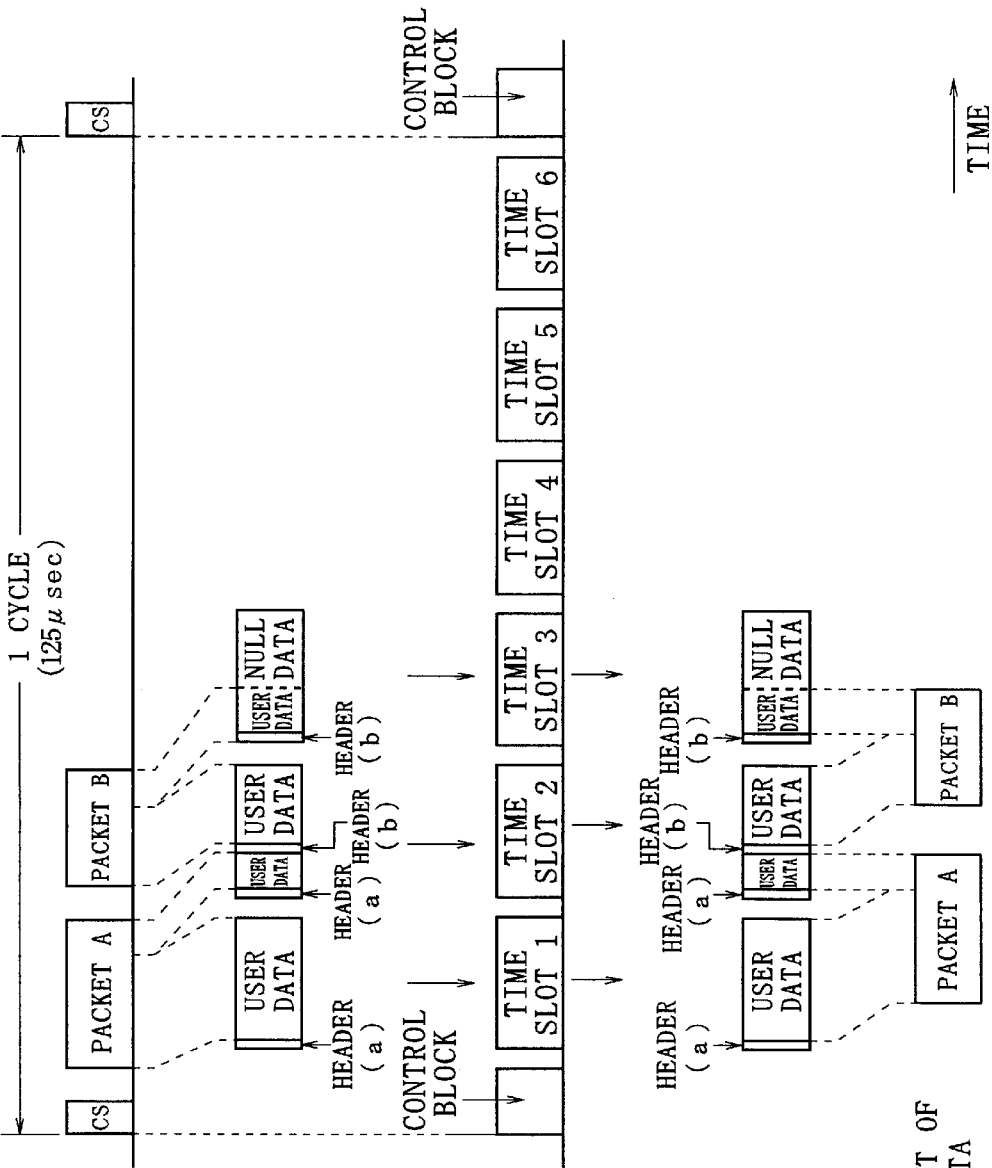

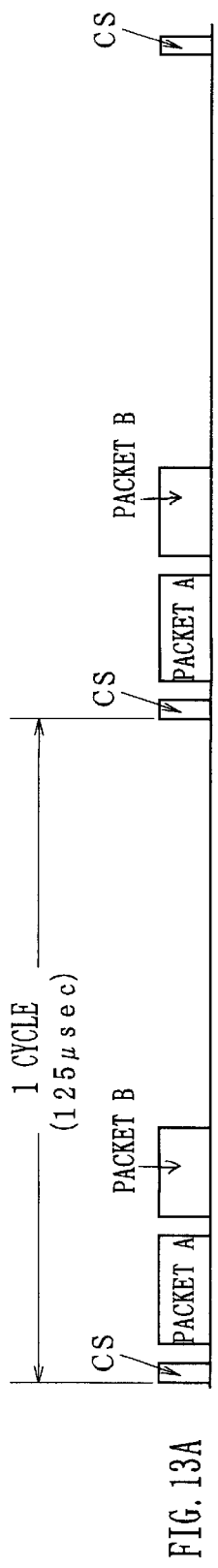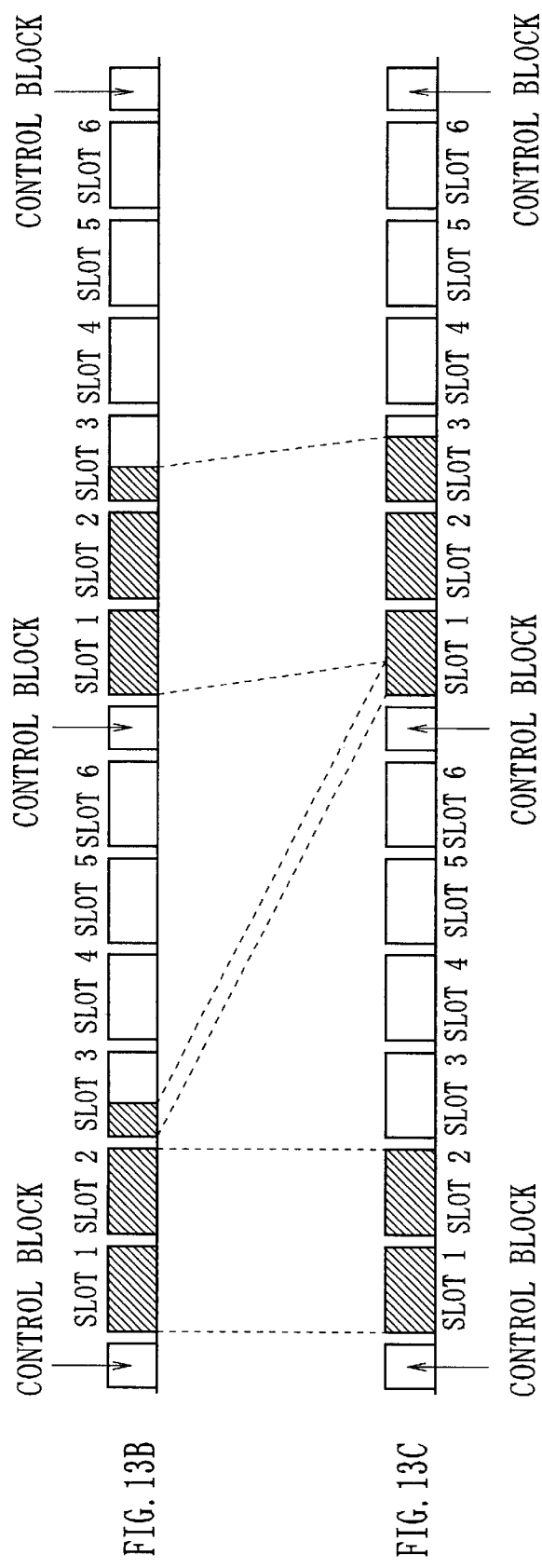
FIG. 13A
FIG. 13B
FIG. 13C

RADIO COMMUNICATION METHOD AND RADIO COMMUNICATION APPARATUS

BACKGROUND OF THE INVENTION

1. Field of the Invention

The present invention generally relates to a radio communication method and a radio communication apparatus capable of transferring data among a plurality of nodes within a wireless network. More particularly, this invention relates to a radio communication method and a radio communication apparatus which can transfer a fixed length data block among respective nodes by using a predetermined time slot of a plurality of time slots provided within respective consecutive cycles and in which a control node can manage the transmission of isochronous communication data of each node at the unit of one cycle or a plurality of cycles, thereby making it possible to improve a transmission efficiency.

2. Description of the Related Art

Recently, as portable devices such as a notebook-size portable computer and an electronic notebook become widespread, a variety of analog and digital interfaces had hitherto been made wireless and high-speed. Particularly in the computers fields, a variety of analog and digital interfaces have been so far made wireless and high-speed actively. For example, by using technologies represented by a wireless LAN (local area network) and IrDA (infrared data association), a network based on a non-contact connection has been constructed between stationary devices as well as portable devices.

In the wireless LAN, for example, a communication among a plurality of nodes is made possible by using an access control protocol called a CSMA (carrier sense multiple access). Moreover, in the IrDA, a communication between two nodes is made possible by using an access control protocol called an IrLAP (infrared link access protocol).

However, when recent high-speed serial buses represented by USB (universal serial bus) and IEEE 1394 serial bus, for example, are made wireless, these access technologies cannot be used as they are. As is well-known, these high-speed serial buses are adapted to support a transfer system called an isochronous transfer system in order to transmit application data which may attach importance to a real-time property, such as AV (audio-visual) data. This isochronous transfer system is a transfer system in which a transfer of data of a constant data amount at a constant cycle, which become important factors for achieving a real-time property of device, can be realized by guaranteeing a data transfer width and a data transfer time.

In order to realize such transfer system by a wireless network comprising a plurality of nodes, transmission nodes should be frequently switched so as to guarantee transfer widths and transfer times of individual data transmitted from a plurality of nodes. For this reason, the above-mentioned access control protocol for the IrLAP which is used in a one-to-one relationship cannot be used as it is, and also the above-mentioned access control protocol called CSMA in which the transfer width is guaranteed after the state in which a space is not yet used was detected cannot be used as it is.

The assignee of the present application has previously proposed the above-mentioned wireless network in which a fixed-length data block is transferred between respective nodes by effectively utilizing a predetermined time slot of a plurality of time slots provided within each consecutive cycle (see Japanese laid-open patent application No. 9-267045). In this case, when a packet with a fixed data length (isochronous communication data) is transferred like the isochronous transfer system, the processing for controlling a node switching timing, or the like can be simplified by reserving several time slots.

However, the length of packet transmitted in actual practice is not always identical to an integral multiple of a length of this fixed-length data block. Let it now be assumed that a represents a length of data block and the length of packet is slightly longer than the length a, i.e. $(a+b)(a>>b)$. Then, in order to transfer the very small packet remaining portion b, another one data block (one time slot) should be used. This means that, if the remaining portion $(a-b)$ has no transmission data, then a transmission efficiency is unavoidably lowered on the whole.

SUMMARY OF THE INVENTION

It is an object of the present invention to provide a radio communication method and a radio communication apparatus in which a fixed-length data block is transferred between respective nodes by using a predetermined time slot of a plurality of time slots provided within each consecutive cycle and which can improve a transmission efficiency.

According to an aspect of the present invention, there is provided a radio communication method of making a communication within a wireless network comprising one control node and more than one controlled nodes controlled by the control node. This radio communication method is comprised of a communication control process in which the control node controls the transmission of each node such that a fixed-length data block may be transferred between the nodes by using a predetermined time slot of a plurality of time slots provided within each consecutive cycle, wherein the control node manages the transmission of isochronous communication data of each node at the unit of one cycle of a plurality of cycles in the transmission control process.

In accordance with another aspect of the present invention, there is provided a radio communication apparatus which is comprised of one control node and more than one controlled nodes controlled by the control node and in which a fixed-data block is transferred between the nodes by using a predetermined time slot of a plurality of time slots provided within each consecutive cycle, wherein the control node includes a transmission management means for managing the transmission of isochronous communication data of each node at the unit of one cycle or a plurality of cycles.

In the present invention, the wireless network comprises one control node and more than one controlled nodes controlled by this control node, and the present invention relates to a communication effected within this wireless network. The transmission in each node is controlled by the control node, and a fixed-length data block is transferred between the respective nodes by using a predetermined slot of a plurality of time slots provided with each consecutive cycle.

In this case, the control node manages the transmission of isochronous communication data of each node at the unit of one cycle or a plurality of cycles. This unit information is reported to the control node from each node, for example. Each node calculates a total data length of isochronous communication data transmitted within one cycle, for example, calculates a remainder by dividing this total data length with a data length of the data block, and obtains the unit information by using this remainder.

Since the control node manages the transmission of isochronous communication data of each node at the unit of one cycle or a plurality of cycles as described above, the portions in which data block becomes useless can be reduced, thereby making it possible to improve a transmission efficiency.

BRIEF DESCRIPTION OF THE DRAWINGS

FIGS. 6A, 6B, 6C are diagrams showing the kinds of data blocks and the contents of headers, respectively;

FIGS. 12A through 12E are diagrams to which reference will be made in explaining the manner in which a data block is converted and a packet is reconfigured, respectively;

FIGS. 13A to 13C are diagrams to which reference will be made in explaining a unit by which a control node can manage isochronous communication data, respectively.

DESCRIPTION OF THE PREFERRED EMBODIMENT

A radio communication method and a radio communication apparatus according to an embodiment of the present invention will hereinafter be described with reference to the drawings.

Figure 1:
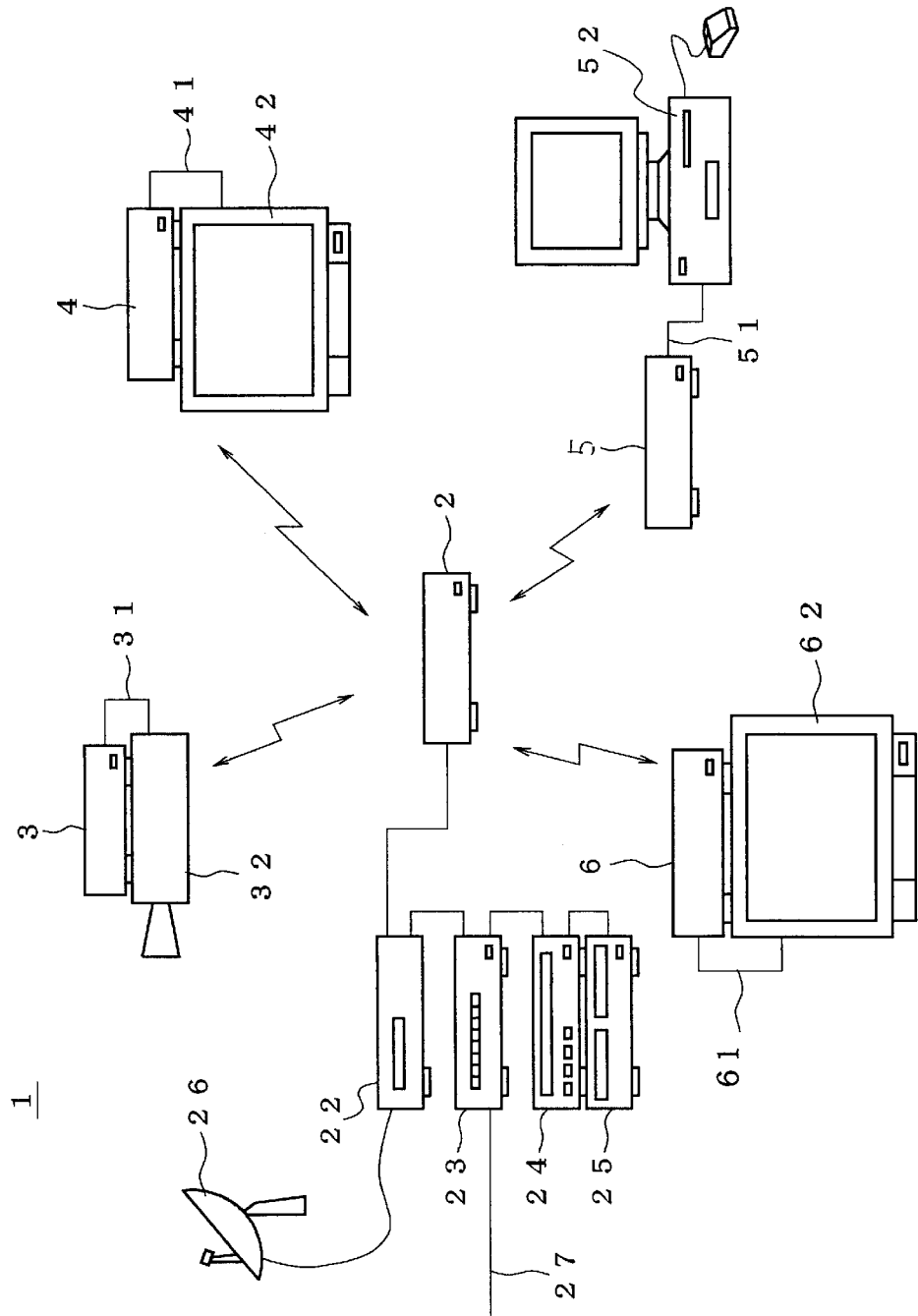
FIG. 1 is a systematic diagram showing a wireless network according to an embodiment of the present invention.

FIG. 1 of the accompanying drawings shows an example of an arrangement of a wireless network 1 using infrared rays as a wireless communication medium. As shown in FIG. 1, this wireless network 1 may include five wireless network nodes (hereinafter simply referred to as "WN nodes") 2 to 6.

The WN node 2 may be connected to an IEEE 1394 bus 21. This IEEE 1394 bus 21 may have further connected thereto a satellite broadcasting receiver 22, a CATV (cable television) receiver (set-top box) 23, a digital video disk (DVD) apparatus 24 and a video cassette recorder (VCR) 25, all of which may be served as IEEE 1394 nodes. The satellite broadcasting receiver 22 may have connected thereto an antenna 26 for receiving a satellite broadcasting signal. The CATV receiving device 23 may have connected thereto a cable 27 through which a CATV signal is transmitted.

The WN node 3 may be connected to an IEEE 1394 bus 31. This IEEE 1394 bus 31 may have further connected thereto a video camera 32 serving as an IEEE 1394 node. The WN node 4 may be connected to an IEEE 1394 bus 41. The IEEE 1394 bus 41 may have further connected thereto a monitor 42 serving as an IEEE 1394 node.

The WN node 5 may be connected to an IEEE 1394 bus 51. The IEEE 1394 bus 51 may have further connected thereto a computer 52 serving as an IEEE 1394 node. The WN node 6 may be connected to an IEEE 1394 bus 61, and the IEEE 1394 bus 61 may have connected thereto a monitor 62 serving as an IEEE 1394 node.

In the wireless network shown in FIG. 1, when data is transferred from the first node connected to a certain WN node to the second node connected to other WN node, data is converted into an infrared signal, and transferred from the first node to the second node.

Figure 3:
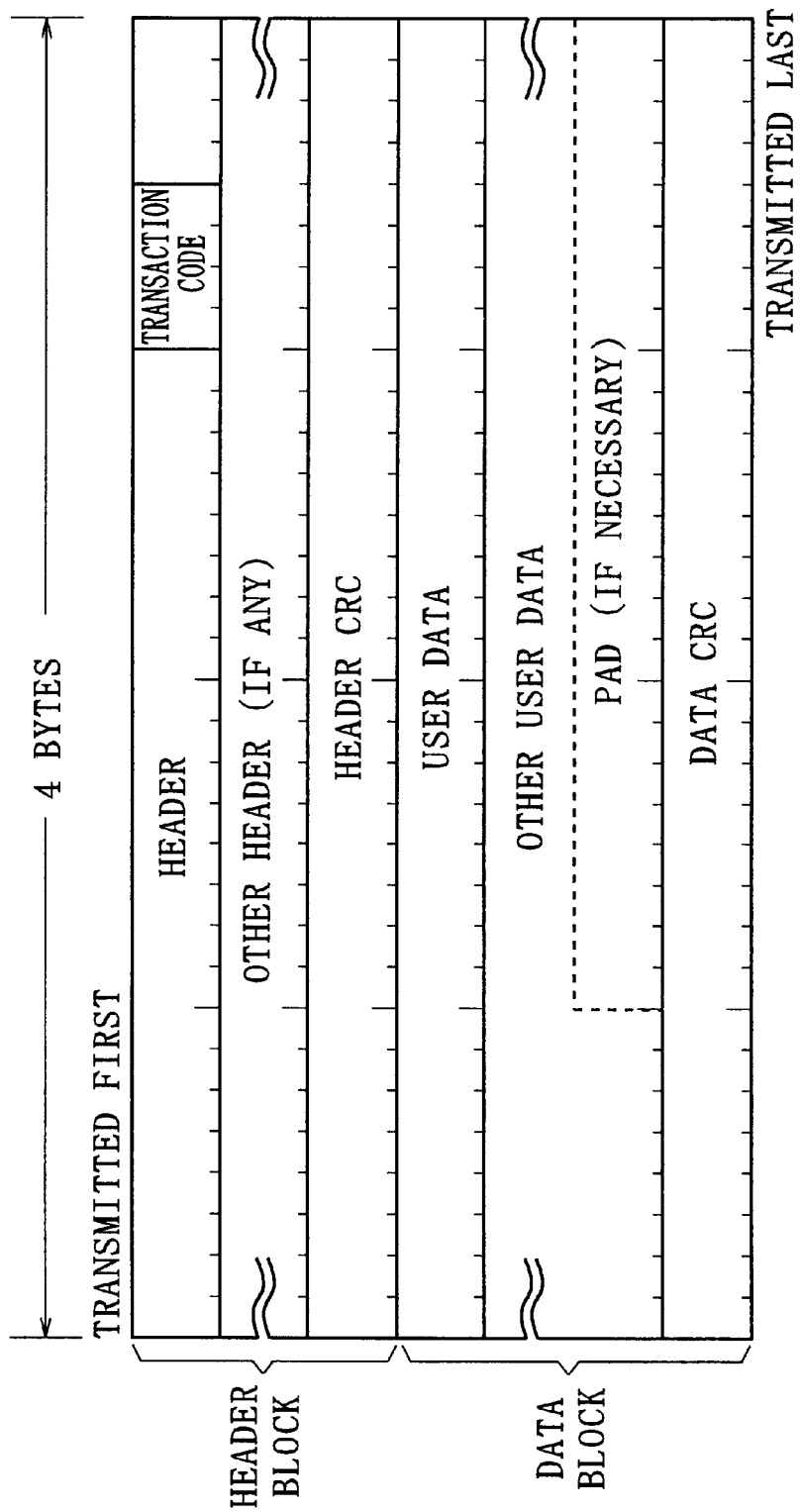
FIG. 3 is a diagram showing a basic format of an IEEE 1394 standard packet.

According to the IEEE 1394 standard, data may be transferred at the unit of packets. FIG. 3 shows a data format used to effect the IEEE 1394 standard data communication, i.e. a basic format of packet. Roughly classified, as shown in FIG. 3, this packet may comprise a header, a transaction code (tcode), a header CRC (cyclic redundancy check code), user data and data CRC. The header CRC is generated based on only a header. The IEEE 1394 standard restricts nodes so as not to act on or respond to headers which are determined as being unsatisfactory by the header CRC. According to the IEEE 1394 standard, the header has to contain the transaction code, and the transaction code may define the kinds of main packets.

According to the IEEE 1394 standard, an isochronous packet and an asynchronous packet are available as derivatives of the packet shown in FIG. 3. The isochronous packet and the asynchronous packet may be distinguished from each other by the transaction code.

Figure 4:
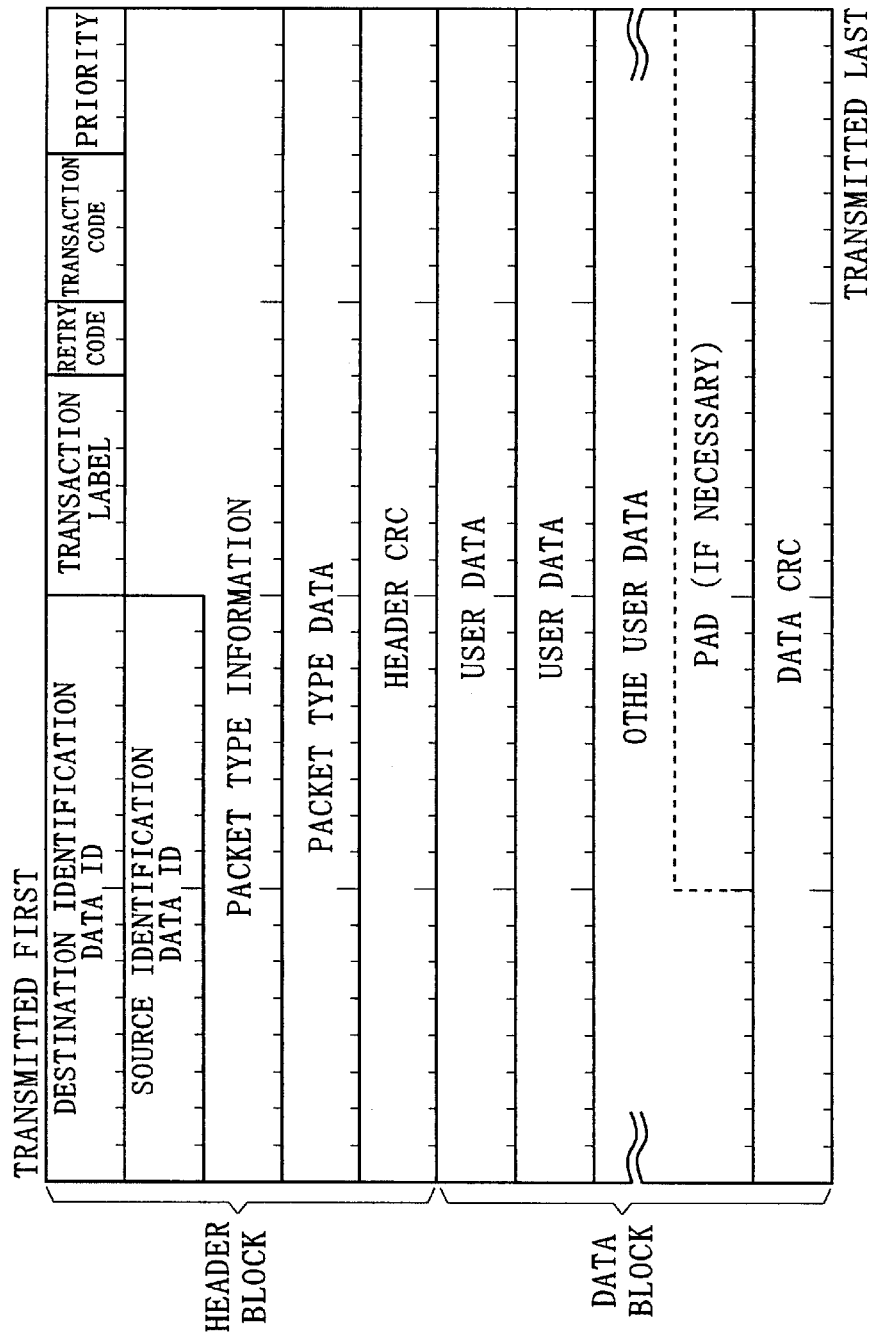
FIG. 4 is a diagram showing a data format of an IEEE 1394 standard asynchronous packet.

FIG. 4 shows a data format of the asynchronous packet. In the asynchronous packet, as shown in FIG. 4, a header may comprise destination node identification data (destination_ID), a transaction label (tl), a retry code (rt), a transaction code (tcode), priority information (pri), source node identification data (source_ID), packet type inherent information (destination_offset, rcode, reserved), packet type inherent data (quadlet_data, data_length, extended_tcode) and a header CRC.

Figure 5:
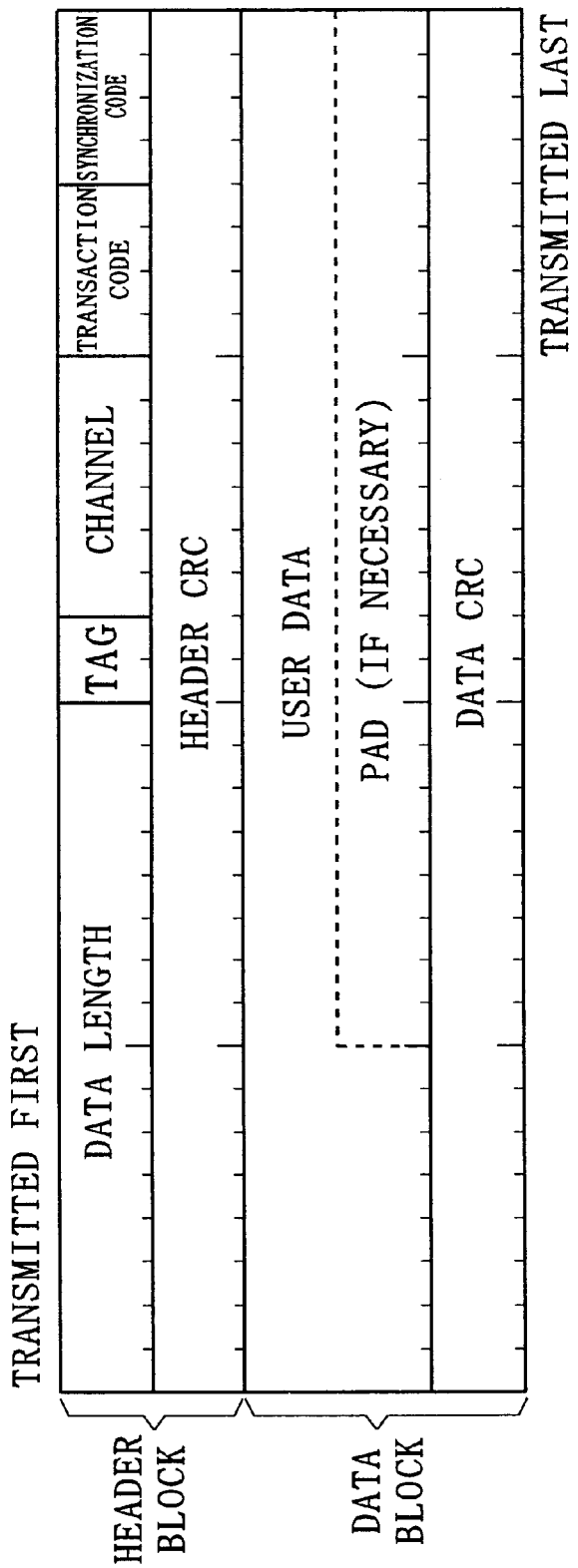
FIG. 5 is a diagram showing a data format of an IEEE 1394 standard isochronous packet.

FIG. 5 shows a data format of the isochronous packet. In this isochronous packet, as shown in FIG. 5, a header may comprise a data length (data_length), an isochronous data format tag (tag), an isochronous channel (channel), a transaction code (tcode), a synchronization code (sy) and a header CRC.

Although it is well-known that the above-mentioned packets (isochronous packet and asynchronous packet) according to the IEEE 1394 standard are the variable-length packets, according to the embodiment of the present invention, data may be transferred from a certain node WN to other WN node at the unit of fixed-length data blocks. To this end, according to the embodiment of the present invention, the fixed-length data block may be generated based on packet data such as the IEEE 1394 standard isochronous packet and asynchronous packet.

When the variable-length packet is longer than the fixed-length data block, the variable-length packet is divided into a plurality of variable-length packets so that data of the variable-length packets may be contained in a plurality of data blocks. In that case, there are generated three kinds of fixed-length data blocks.

FIG. 6A shows the first fixed-length data block having user data comprising only data of one packet. In this data block, as shown in FIG. 6A, a header is located ahead of the user data, and the user data is followed by a parity. This parity is an error-correcting code (ECC) for error-correcting the header and the user data. FIG. 6B shows the second fixed-length data block having user data comprising data of a plurality of packets (two packets in the illustrated example). In this data block, headers are located ahead of the two user data, and the second user data is followed by a parity. The parity may be used to error-correct the whole of the headers and the two user data.

FIG. 6C shows the third fixed-length data block having user data comprising data of one or a plurality of packets (one packet in the illustrated example) and a space area with null data (empty data) attached thereto. In this data block, as shown in FIG. 6C, a header is located ahead of the user data, and the null data is followed by a parity. This parity may be used to error-correct the whole of the header, the user data and the null data.

When the transfer rate is held at 24.576 Mbps, the data block may comprise the parity of 8 bytes and other data of 52 bytes, and is QPSK (quadrature-phase-shift-keying)-modulated and then transferred in the form of data of 240 symbols. When the transfer rate is held at 2×24.576 Mbps, the data block may comprise the parity of 16 bytes and other data of 104 bytes, and 16QAM (16 quadrature-amplitude-modulation)modulated, and then transferred in the form of data of 240 symbols. Further, when the transfer rate is held at 4×24.576 Mbps, the data block may comprise the parity of 32 bytes and other data of 208 bytes, and is 256QAM (256 quadrature-amplitude-modulation)-modulated, and then transferred in the form of data of 240 symbols.

The header may be comprised of 4 bytes and may include a packet ID area, a source ID area, a data-length information area, a data type information area, a divide information area and a reserve area as shown in FIG. 6A. The packet ID area has stored therein the packet ID of 7 bits, for example. The original packet may be identified by using packet IDs "1" to "127", in that order. After the packet ID "127" was used, the packet IDs are sequentially used from the packet ID "1". The source ID area may have stored therein a node ID of a source WN node. This node ID may be comprised of data of 3 bits, for example, when 7 WN nodes, at maximum, may constitute the wireless network. A node ID of control node is set to "111".

Figure 7:
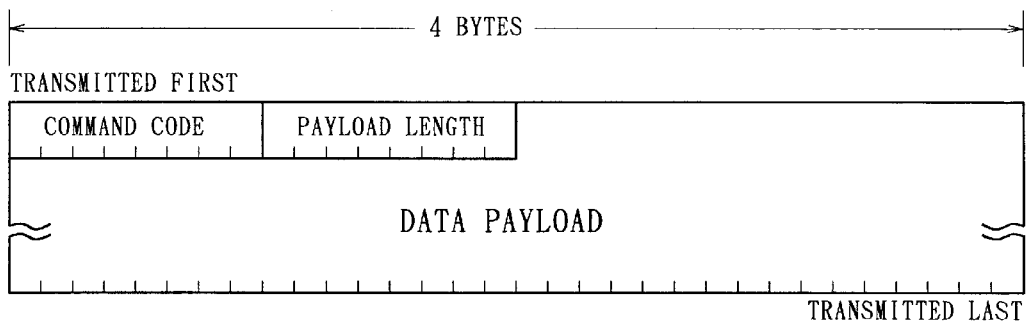
FIG. 7 is a diagram showing a data format of an access layer command.

The data length information area may have stored therein information indicative of the length of user data. The data type information area may have stored therein codes which may be used to determine the classification of user data such as, whether user data is isochronous packet data, asynchronous packet data or access layer command data. When the user data is of the access layer command, the user data of the data block may include an access layer command whose data format is shown in FIG. 7.

The access layer command may be used to transmit and receive exclusive-commands between two access layers so that setting information may be transmitted and received between the WN node serving as a control node and the WN node serving as a controlled node. Although the access layer command is located in the user data of the data block, the access layer command is completed between the access layers, and therefore need not be assembled in the form of the IEEE 1394 packet. A command code may indicate the kind of the access layer command. A payload length may indicate the length of a command occupying the user data (payload) at the unit of bytes. The payload may have stored therein an access layer command. The access layer command may be stored in the data payload from the starting portion. When the data payload does not reach the unit of quadlet (4 bytes), the empty portion of the data payload may be filled with null data.

Referring back to FIG. 6A, the divide information area may have stored therein information concerning the status of packets such as "NOT DIVIDED", "START PORTION OF DIVIDED PACKET", "MIDDLE PORTION OF DMDED PACKET" or "END PORTION OF DIVIDED PACKET".

Figure 8:
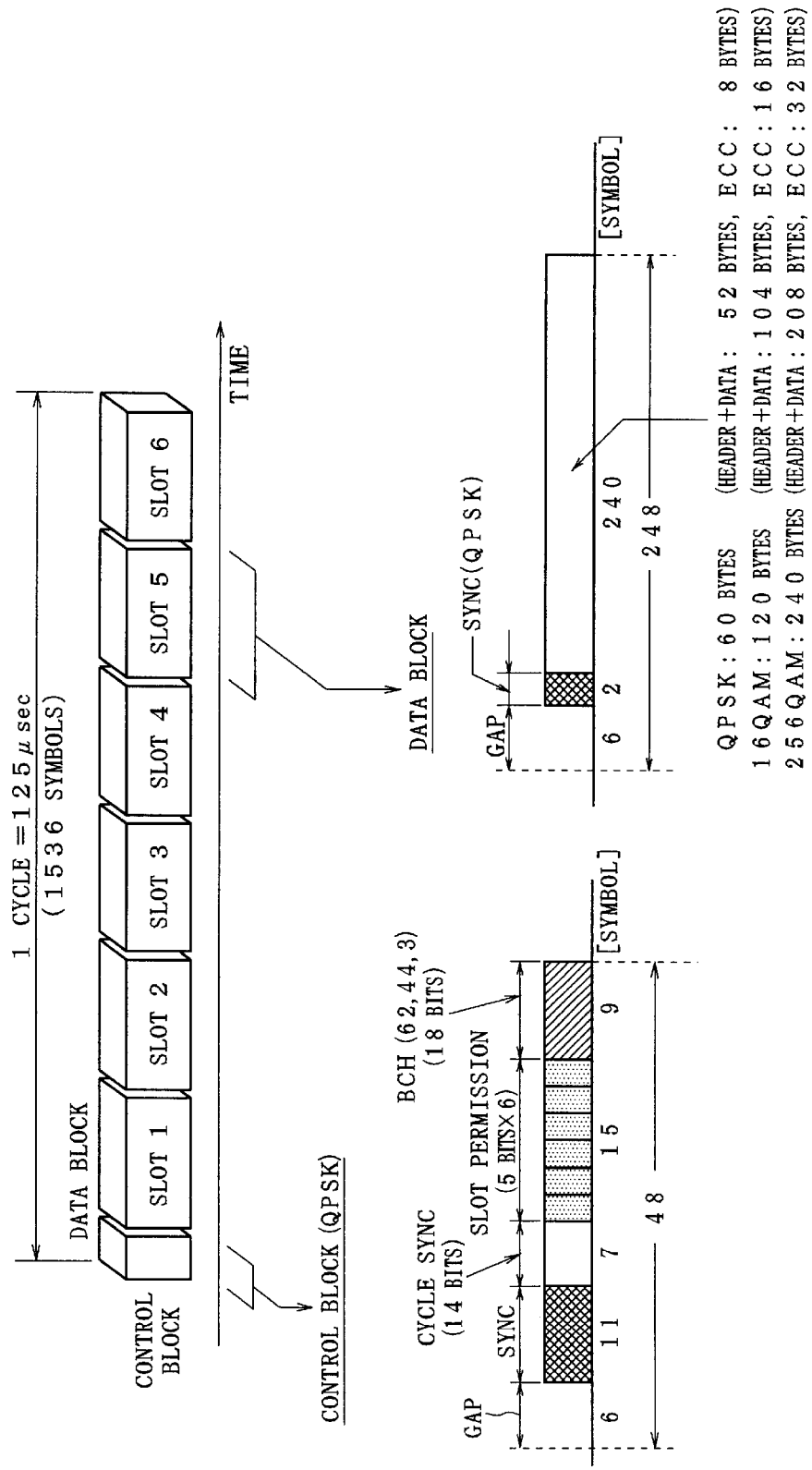
FIG. 8 is a data format of a radio communication effected by using infrared rays.

As described above, the fixed-length data block generated by each WN node is transferred by effectively utilizing a plurality of time slots provided within each consecutive cycle of 125 microseconds. FIG. 8 shows a data format of a radio communication according to the embodiment of the present invention. As shown in FIG. 8, there are provided 6 time slots (time slots 1 to 6) within each cycle. One of the above-mentioned WN nodes may act as a control node, and each WN node may transmit data under control of the control node.

The WN node serving as the control node may transmit a control block during each cycle prior to the time slots 1 to 6. This control block is QPSK-modulated and comprises a gap area of 6 symbols, a sync area of 11 symbols, a cycle sync area of 7 symbols, a slot permission area of 15 symbols and an error-correction area of 9 symbols.

As will be described later on, the controlled node may reproduce a transfer clock signal of the control node from data of this control block, and may synchronize its own transfer clock signal with the reproduced transfer clock signal of the control node. In this manner, the control block transmitted from the control node may be served also as a clock synchronizing signal.

The sync area may include a sync code to detect a control block. The cycle sync area may have stored therein data of low-order 12 bits of cycle time data of 32 bits contained in a cycle start packet which is transferred from an IEEE 1394 node called a cycle master to the IEEE 1394 bus once per 125 microseconds (isochronous cycle). Remaining two bits (one symbol) of the cycle sync area may be used as a reserve area.

Figure 9:
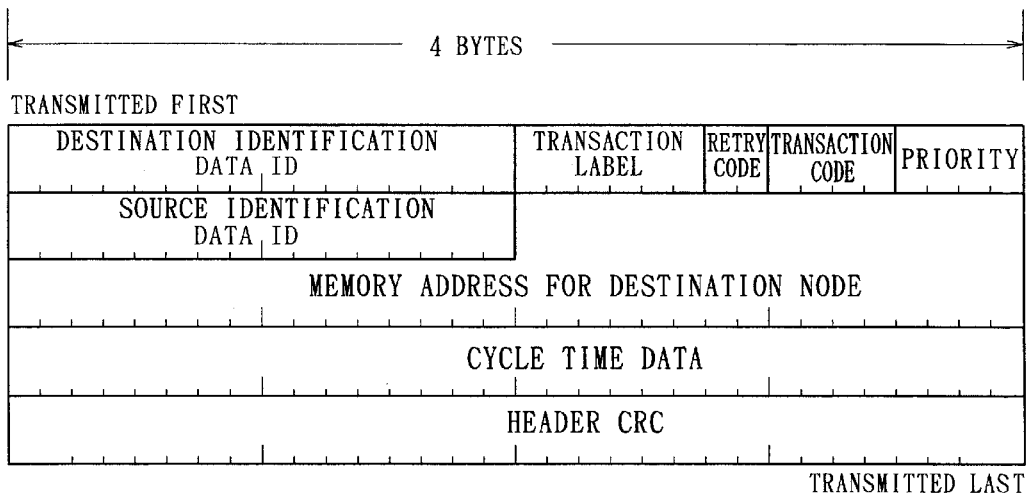
FIG. 9 is a diagram showing a data format of an IEEE 1394 standard cycle start packet.
Figure 10:
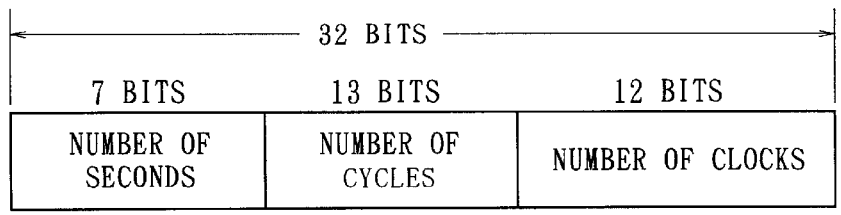
FIG. 10 is a diagram showing an arrangement of cycle time data.

FIG. 9 shows a data format of a cycle start packet. As shown in FIG. 9, the cycle start packet may include a header comprising destination node identification data (destination_ID), a transaction label (tl), a retry code (rt), a transaction code (tcode), priority information (pri), source node identification data (source_ID), destination node memory address (destination_offset), cycle time data and a header CRC. FIG. 10 shows 32-bit cycle time data. As shown in FIG. 10, the 7 bits from the most significant bit of 32 bits may be used to show the seconds, the next 13 bits may be used to show the number of cycles, and the 12 bits from the least significant bit may be used to show the counted value (number of clocks) of the clock signal having the frequency of 24.576 MHz.

The WN node serving as the controlled node may extract the 12-bit data from the cycle sync area of the control block. Then, the WN node may update cycle time data generated from its own cycle time data generating unit by the 12-bit data thus extracted. Thus, relative times of all nodes may be automatically synchronized with each other at the starting portion of each cycle.

Each of the IEEE 1394 buses may include a CSR (Control and Status Registers) defined by ISO/IEC 13213, and the registers of the respective nodes for effecting the isochronous transfer can be realized by transmitting isochronous data of cycle time register at the unit of approximately 125 microseconds. As described above, when cycle time data generated from a cycle time data generating unit of the controlled node is updated by the 12-bit data stored in the cycle sync area of the control block transmitted from the control node at every cycle of 125 microseconds, it is possible to realize the processing equivalent to the automatic synchronization of the IEEE 1394 cycle time registers.

Turning back to FIG. 8, the control block may include the slot permission area which may store therein information of 5 bits each concerning the time slots 1 to 6. The 5-bit information may be comprised of bit 0 to bit 4. When the bit 4 is held at high "1" level, the bit 4 shows the transmission of a tone request signal. When the bit 4 is held at low "0" level, this time, the bit 4 shows the transmission of data. The tone request signal is adapted to transmit a tone signal in order to control a transmission power. When the bit 3 is held at high "1" level, the bit 3 shows that data is isochronous data. When the bit 3 is held at low "0" level, this time, the bit 3 shows that data is asynchronous data. The bit 2, the bit 1 and the bit 0 show node IDs of the WN nodes to permit the transmission. As described above, the node ID of the WN node serving as the control node is set to "111". Also, as will be described later on, a temporarily-used node ID is used to enable a WN node without node ID to have a chance to transmit data when the above-mentioned node ID subscribes for the radio network 1. This temporarily-used node ID is set to "000". Therefore, any of "001" to "110" may be used as the node ID of the WN node serving as the controlled node.

The error-correction area may have stored therein an error-correction code for correcting errors in the cycle sync area and the slot permission area. As the error-correction code, there may be used a BCH (62, 44, 3) code.

Although not shown in FIGS. 6A, 6B and 6C, in actual practice, the data block transferred by the time slots 1 to 6 may include the data area of 240 symbols having a gap area of 6 symbols and a sync area of 2 symbols added thereto as shown in FIG. 8. The sync area may have sync data to detect the data block. Sync data in the sync area may be constantly QPSK-modulated regardless of the modulation system in the data area.

Figure 11:
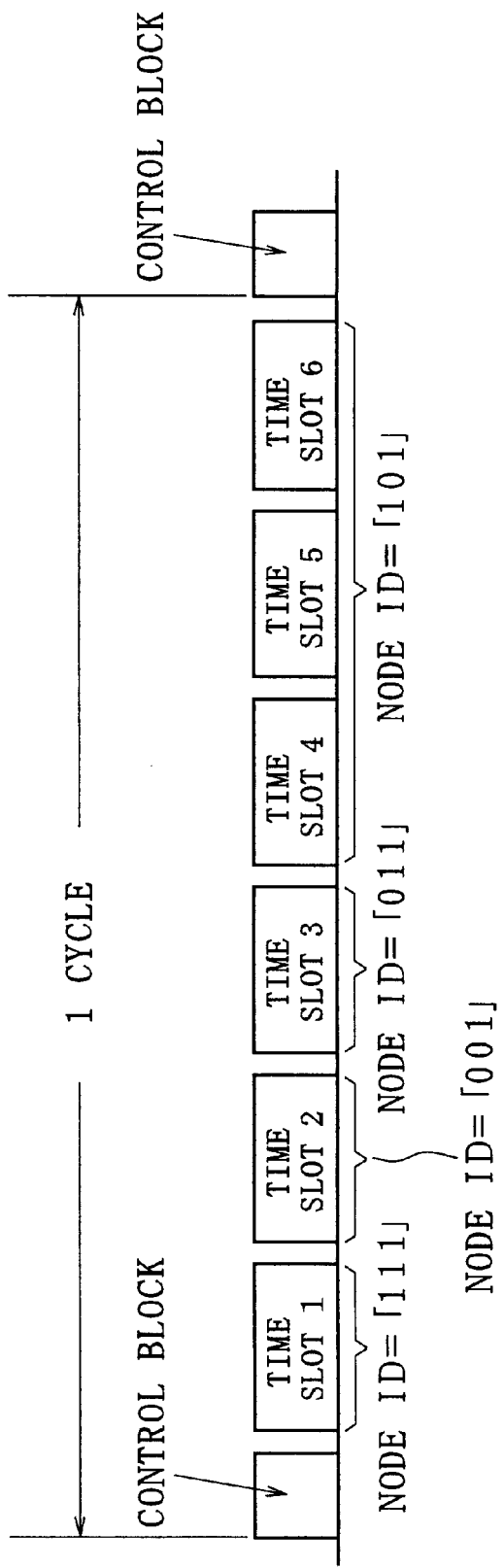
FIG. 11 is a diagram showing the allocation of time slots.

As described above, in the slot permission area of the control block, the respective time slots 1 to 6 designate WN nodes which are able to transmit data. When WN nodes are designated, the next WN nodes, e.g. WN node of the next cycle is designated. FIG. 11 shows the manner in which the time slots 1 to 6 are respectively allocated to WN nodes. In this embodiment, the time slot 1 permits the WN node (control node) with the node ID="111" to transmit data; the time slot 2 permits the WN node with the node ID="001" to transmit data; and the time slot 3 permits the WN node with the node ID="001" to transmit data. Further, the time slots 4 to 6 permit the WN node with the node ID="101" to transmit data.

The control node is able to control the respective WN nodes (control node and controlled node) in transmission by the slot permission area of the control block. In that case, the control node becomes able to determine which node is permitted to transmit data with respect to each of the time slots in response to data transfer information of each WN node, such as a transfer width reserved by the controlled node or data situation of future transfer data reported by the controlled node. The transfer width is reserved from the controlled node to the control node and the data situation of the future transfer data is reported from the controlled node to the control node by the aforementioned access layer command.

Thus, the control node may allocate the time slot to a predetermined WN node to permit the predetermined WN node to transmit data of the reserved transfer width. Also, the control node may allocate other time slot to another WN node. Moreover, the control node is able to easily manage the maximum reserved transfer width by the number of time slots in order to make the transfer of a transfer width other than the reserved transfer width become possible. For example, with respect to data such as asynchronous packet data in which the transfer width is not reserved and which is not cyclic data, it becomes possible to transfer such data by using a time slot corresponding to the transfer width which is not reserved in the transfer of isochronous packet.

When the time slot of the transfer width which is not reserved is used, the controlled node may inform the situation of future transfer data of the control node by using the above-mentioned access layer command, for example. The control node may calculate the distribution of time slots corresponding to the unreserved transfer width by using a variety of information such as the transfer width of the transfer future data obtained from the controlled node, the kind of the packet, priority of contents and maximum permission transfer time and determine the node which is permitted to transfer data and the kind of packet. Thus, it is possible to avoid such phenomenon that data may be easily collected in the WN node which has many transfer future data, for example, and that data cannot be transferred at a desired high transfer rate.

As described above, in the data transfer using the time slots, it becomes possible to vary the transfer processing at every time slot. While the isochronous transfer, for example, should guarantee the data transfer width and the transfer time, the asynchronous transfer should guarantee the transfer contents rather than the transfer time. Accordingly, if data is transferred by separate time slots with respect to the transfer of data with different priorities on these wireless networks, then the transfer processing, such as the processing for providing an unoccupied transfer width to the transfer having a priority with respect to a transfer time or the processing for enabling the resend processing for the transfer having a priority with respect to the guarantee of contents when an error occurs can be easily realized at the unit of time slot.

Figure 2:
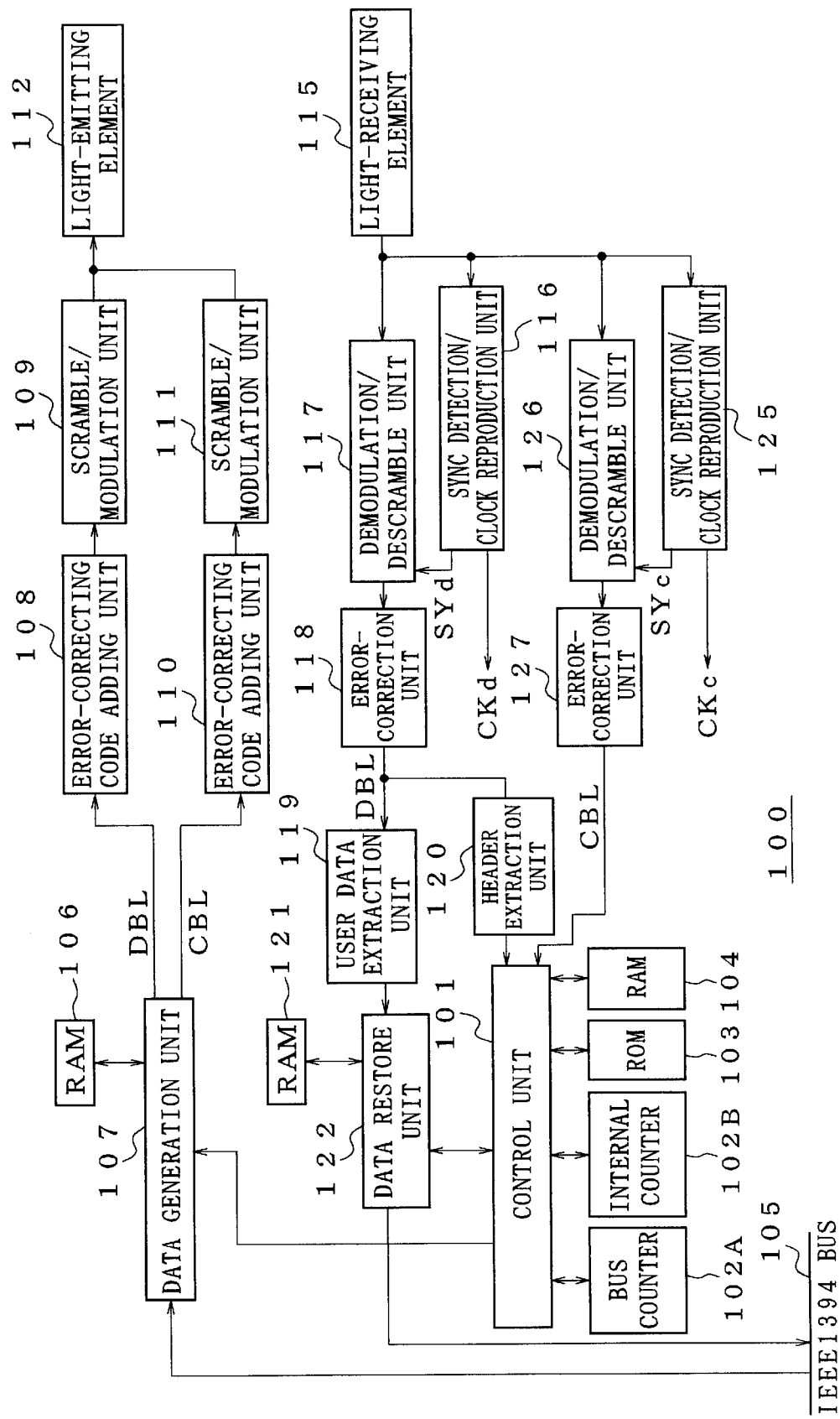
FIG. 2 is a block diagram showing an arrangement of a wireless network node.

An arrangement of the WN node 100 (i.e. WN nodes 2 to 6) will be described next with reference to FIG. 2. FIG. 2 shows in block form an arrangement of the WN node 100 which may be served either as the control node or as the controlled node. As shown in FIG. 2, the WN node 100 may include a control unit 101 which might be formed of a microcomputer to control the entire system of the wireless network. To the control unit 101 may be connected a cycle time data generating unit 102 for generating 32-bit cycle time data (see FIG. 10), a ROM (read-only memory) 103 for storing operation programs of the microcomputer within the control unit 101 and a RAM (random-access memory) 104 served as a work area.

The cycle time data generating unit 102 may count the clock signal of 24.576 MHz in an ascending order. When the WN node 100 is served as the control node, of the 32-bit cycle time data generated from this cycle time data generating unit 102, low-order 12-bit data may be inserted into the cycle sync area of the control block, and then supplied to the controlled node. When on the other hand the WN node 100 may be served as the controlled node, the cycle time data generated from the cycle time data 102 may be updated by the 12-bit data extracted from the cycle sync area of the received control block.

The WN node 100 may include a RAM 106 for temporarily storing packet data such as isochronous packet and asynchronous packet transmitted from other IEEE 1394 node (not shown) connected to the IEEE 1394 bus 105 and a data generation unit 107 for generating data block (only the header and the user data as shown in FIGS. 6A to 6C) DBL by using the packet data accumulated in the RAM 106 under control of the control unit 101.

When the WN node 100 may be served as the control node, the data generation unit 107 may generate a control block (only the cycle sync area and the slot permission area as shown in FIG. 8C) CBL which is transmitted at the starting portion of each cycle of 125 microseconds. Further, the data generation unit 107 may generate an access layer command used to transmit and receive an exclusive-command between the two access layers so that setting information may be transmitted and received between the control node and the controlled node. This access layer command is located in the user data of the data block and then transferred as described above.

The WN node 100 may include an error-correction code adding unit 108 for adding an error-correction parity (ECC) to the data block DBL outputted from the data generation unit 107 and a scramble/modulation unit 109 for scrambling and modulating the outputted data from the error-correction adding unit 108 and which then may add a sync code to the starting portion of the data thus scrambled and modulated.

The WN node 100 may include an error-correction adding unit 110 for adding an error-correction code to the control block CBL outputted from the data generation unit 107, a scramble/modulation unit 111 for scrambling and modulating the outputted data from the error-correction code adding unit 110 and which then adds a sync code to the starting portion of the data thus scrambled and modulated and a light-emitting element (light-emitting diode (LED)) 112 for outputting infrared signals corresponding to the modulated signals outputted from the scramble/modulation units 109, 111. When the WN node 100 is served as the controlled node, the control block CBL may not be generated from the data generation unit 107, and therefore the error-correction code adding unit 110 and the scramble/modulation unit 111 need not be used.

The WN node 100 may include a light-receiving element (photodiode) 115 for receiving an infrared signal and a sync detection/clock reproduction unit 116 for outputting a detection timing signal SYd by detecting a pattern of a sync code of the data block (see FIG. 8) from an outputted signal of the light-receiving element 115 and which generates a clock signal CKd synchronized with the data block whose sync code was detected. The clock signal CKd may be used when the data block whose sync code was detected may be processed.

The WN node 100 may include a demodulation/descramble unit 117 for descrambling and demodulating the data block from which the sync code was detected based on the detection timing signal SYd, an error-correction circuit 118 for error-correcting the header and the user data of the data block outputted from the demodulation/descramble unit 117 by using the parity, a user data extraction unit 119 for extracting user data from the data block DBL outputted from the error-correction unit 118 and a header extraction unit 120 for extracting a header attached to the user data from the data block DBL. A header extracted by the header extraction unit 120 may be supplied to the control unit 101.

The WN node 100 may include a RAM 121 for temporarily storing the user data extracted by the user data extraction unit 119 and a data restore unit 122 for restoring the packet data based on header information by using the user data accumulated in the RAM 121 and which transmits the packet data thus restored to the IEEE 1394 node connected to the bus 105. When the user data may be the access layer command, such command may be transmitted from the data restore unit 122 to the control unit 101.

The WN node 100 may include a sync detection/clock reproduction unit 125 for outputting a detection timing signal SYc by detecting a pattern of a sync code of the control block (see FIG. 8) from the outputted signal of the light-receiving element 115 and which generates a clock signal CKc synchronized with the control block from which the sync code was detected. The clock signal CKc may be used to process the control block from which the sync code was detected, and may also be used as a transfer clock signal for effecting the transmission processing.

The WN node 100 may include a demodulation/descramble unit 126 for demodulating and descrambling the control block from which sync code was detected based on the detection timing signal SYc and an error-correction circuit 127 for error-correcting the control block (cycle sync area and slot permission area) CBL of the data outputted from the demodulation/descramble unit 126 by using the error-correction code and which supplies the control block thus error-corrected to the control unit 101.

When the WN node 100 may be served as the control node, the demodulation/descramble unit 126 and the error-correction unit 127 are disabled. When the WN node 100 may be served as the control node, the sync detection/clock reproduction unit 125 does not execute the synchronization processing with reference to the clock signal reproduced from the control block, and functions as a free-running transfer clock signal generation unit.

An operation of the WN node (wireless network node) 100 shown in FIG. 2 will be described next.

Initially, the manner in which the WN node 100 is operated when the WN node 100 is served as the control node will be described. The transmission operation will be executed as follows.

Under control of the control unit 101, the data generation unit 107 may generate the control block CBL (see FIG. 8) at the starting portion of each cycle of 125 microseconds. Then, the error-correction code adding unit 110 may add the error-correction code to the control block CBL, and the descramble/modulation unit 111 may descramble and modulate the control block thus error-corrected and may add the sync code thereto, thereby resulting in the control block transmission signal being generated. Then, the light-emitting element 112 may be driven by this transmission signal, and this light-emitting element 112 may output the control block in the form of the infrared signal.

When packet data such as an isochronous packet or an asynchronous packet may be transmitted to the data generation unit 107 from the IEEE 1394 node through the bus 105, this packet data may be temporarily stored in the RAM 106. Then, under control of the control unit 101, the data generation unit 107 may generate the data block DBL (see FIGS. 6A to 6C) from the packet data stored in the RAM 106. The data generation unit 107 may generate one data block DBL each at the timing of each time slot whose transmission is permitted. Then, the error-correction code adding unit 108 may add the error-correction code to the data block DBL. Further, the scramble/modulation unit 109 may scramble and modulate the resultant data block DBL and may add the sync code to the same, thereby resulting in the data block transmission signal being generated. The light-emitting element 112 may be driven by this transmission signal, and this light-emitting element 112 may output the data block in the form of the infrared signal.

Next, the reception operation will be described below. The light-receiving element 115 may receive the infrared signal of the data block. Then, the outputted signal from the light-receiving element 115 may be supplied to the sync detection/clock reproduction unit 116 which may generate the detection timing signal SYd by detecting the sync code of the data block. Also, the sync detection/clock reproduction unit 116 may generate the clock signal CKd synchronized with the data block from which the sync code was detected.

Then, the outputted signal from the light-receiving element 115 may be supplied to the demodulation/descramble unit 117 and thereby demodulated and descrambled based on the detection timing signal SYd. Further, the outputted data from the demodulation/descramble unit 117 may be supplied to the error-correction unit 118 and thereby the data block DBL is error-corrected based on the error-correction code.

The data block DBL from the error-correction unit 118 may be supplied to the header extraction unit 120 and thereby the header may be extracted. The header thus extracted may be supplied to the control unit 101. In a like manner, the data block DBL from the error-correction unit 118 may be supplied to the user data extraction unit 119, and the user data may be supplied to the data restore unit 122. The data restore unit 122 may reconfigure packet data from the user data thus extracted under control of the control unit 101 based on the header information. The packet data thus reconfigured may be transmitted through the bus 105 to the IEEE 1394 node.

The manner in which the WN node is operated when the WN node is served as the controlled node will be described. Initially, the transmission operation will be described below.

When the packet data such as the isochronous packet or the asynchronous packet may be transmitted to the data generation unit 107 from the IEEE 1394 node through the bus 105, this packet data may be temporarily stored in the RAM 106. Then, under control of the control unit 101, the data generation unit 107 may generate the data block DBL (see FIGS. 6A to 6C) from the packet data stored in the RAM 106. The data generation unit 107 may output one data block DBL each at the timing of each time slot whose transmission was permitted. Then, the error-correction code adding unit 108 may add the error-correction code to this data block DBL, and may add the sync code to the data block DBL after the data block DBL was scrambled and modulated by the scramble/modulation unit 109, thereby resulting in the data block transmission signal being generated. The light-emitting element 112 may be driven by this transmission signal, and the light-emitting element 112 may output the data block in the form of the infrared signal.

Next, the reception operation will be described below. The light-receiving element 115 may receive the infrared signals of the control block and the data block. The outputted signal from the light-receiving element 115 may be supplied to the sync detection/clock reproduction unit 125 which may generate the detection timing signal SYc by detecting the sync code of the control block. Also, the sync detection/ clock reproduction unit 125 may generate the clock signal CKc synchronized with the control block whose sync code was detected. The clock signal CKc may be used to process the control block as described above, and may also be used as the transfer clock signal. That is, the aforementioned transmission operation is executed in synchronism with the transfer clock.

Then, the outputted signal from the light-receiving element 115 may be supplied to the demodulation/descramble unit 126 and thereby demodulated and descrambled based on the detection timing signal SYc. Further, the outputted data from the demodulation/descramble unit 126 may be supplied to the error-correction unit 127 which may error-correct the control block CBL by using the error-correction code.

The control block CBL outputted from the error-correction unit 127 may be supplied to the control unit 101. The control unit 101 may extract 12-bit data from the cycle sync area of the control block CBL, and may update the cycle time data generated from the cycle time data generation unit 102 by the 12-bit data. Thus, relative times of all nodes may be automatically synchronized with each other at the starting portion of each cycle. Moreover, the control unit 101 may recognize the time slot whose transmission was permitted based on information of the slot permission area of the control block CBL.

The outputted signal from the light-receiving element 115 may be supplied to the sync detection/clock reproduction unit 116 which may generate the detection timing signal SYd by detecting the sync code of the data block. The sync detection/clock reproduction unit 116 may generate also the clock signal CKd synchronized with the data block whose sync code was detected.

Then, the outputted signal from the light-receiving element 115 may be supplied to the demodulation/descramble unit 117 and thereby demodulated and descrambled based on the detection timing signal SYd. Further, the outputted data from the demodulation/descramble unit 117 may be supplied to the error-correction unit 118 which then may error-correct the data block DBL by using the error-correction code.

The data block DBL from the error-correction unit 118 may be supplied to the header extraction unit 120 and thereby the header may be extracted. The header thus extracted may be supplied to the control unit 101. Similarly, the data block DBL from the error-correction unit 118 may be supplied to the user data extraction unit 119, and this user data may be supplied to the data restore unit 122. The data restore unit 122 may reconfigure packet data from the extracted user data under control of the control unit 101 based on the header information. The packet data thus reconfigured may be transmitted through the bus 105 to the IEEE 1394 node.

The manner in which the IEEE 1394 standard packet data is transferred from the first WN node to the second WN node will be described with reference to FIGS. 12A through 12E.

Let us now consider the case in which packets A and B may be transmitted from the IEEE 1394 node to the data generation unit 107 of the first WN node as packet data after the cycle start packet (CS) was transmitted as shown in FIG. 12A. The cycle start packet may be transmitted from the cycle master once per 125 microseconds. In that case, the time interval in which the cycle start packet may be transmitted from the cycle master is not always limited to the time interval of 125 microseconds, and it is frequently observed that such time interval may exceed 125 microseconds depending upon the magnitude of the packet data.

The data generation unit 107 may generate a fixed-length data block from these packets A and B as shown in FIG. 12B. In that case, the data generation unit 107 may generate from the data lengths of the packets A and B a data block having only data of the packet A, for example, a data block having data of the packets A and B and a data block having only data of the packet B and in which null data may be located in the space area. A header having information of original packet, divide information, or the like may be located at the starting portion of data (user data) comprising each packet.

The data block thus generated by the data generation unit 107 of the first WN node may be transmitted to the second WN node from the WN node serving as the control node by using the time slots 1 to 3 whose transmissions are permitted as shown in FIG. 12C. In that case, the error-correction parity may be added to the data block, and the data block may be scrambled and modulated. Thereafter, the sync code may be added to the data block, and the resultant data block may be transmitted in the form of the infrared signal.

The second WN node may receive the data block transmitted from the first WN node as shown in FIG. 12D. User data extracted from this data block may be supplied to the data restore unit 122, and the header extracted from the data block may be supplied to the control unit 101. Then, the data restore unit 122 may reconfigure the original packet data from the user data based on information of original packet contained in the header, divide information, or the like as shown in FIG. 12E. Then, this packet data may be transmitted to the IEEE 1394 node.

When the control node may manage the transmission of the isochronous communication data (isochronous packet) of each node at the unit of one cycle, as described above, there are many data block portions which become useless, thereby resulting in the transmission efficiency being lowered. For example, as shown in FIG. 13A, when the packets A and B are isochronous communication data concerning a certain node and a synthesized data length of the packets A and B is 2.4 data blocks, data of the packets A and B may be transmitted by using three time slots shown hatched in FIG. 13B. In this case, although only the 0.4 portion of the last time slot is used substantially, the transmission node cannot be switched in somewhere of the time slot with the result that the remaining portion of such time slot cannot be used for the transmission of other node.

Therefore, according to the embodiment of the present invention, the control node may control the transmission of the isochronous communication data of each node at the unit of one cycle or a plurality of cycles. In this case, unit information may be informed of the control node from the node which may intend to transmit such isochronous communication data. This unit information may be informed of the control node by using the above-mentioned access layer command, for example.

The control node may control the transmission of the isochronous communication data of a certain node such that, when the transmission of the isochronous communication data of a certain node is managed at the unit of N cycles (N is an integer greater than 2 cycles), if Q represents a quotient and R represents a remainder obtained when a total data length of isochronous communication data of N cycles is divided by N, then Q time slots may be used in the first to N−1th cycles of N cycles, for example, and Q+1 time slots may be used in the Nth cycle. Of course, the control node may control the transmission of the isochronous communication data of a certain node such that, when R is zero, Q time slots may be used even in the Nth cycle.

Figure 14:
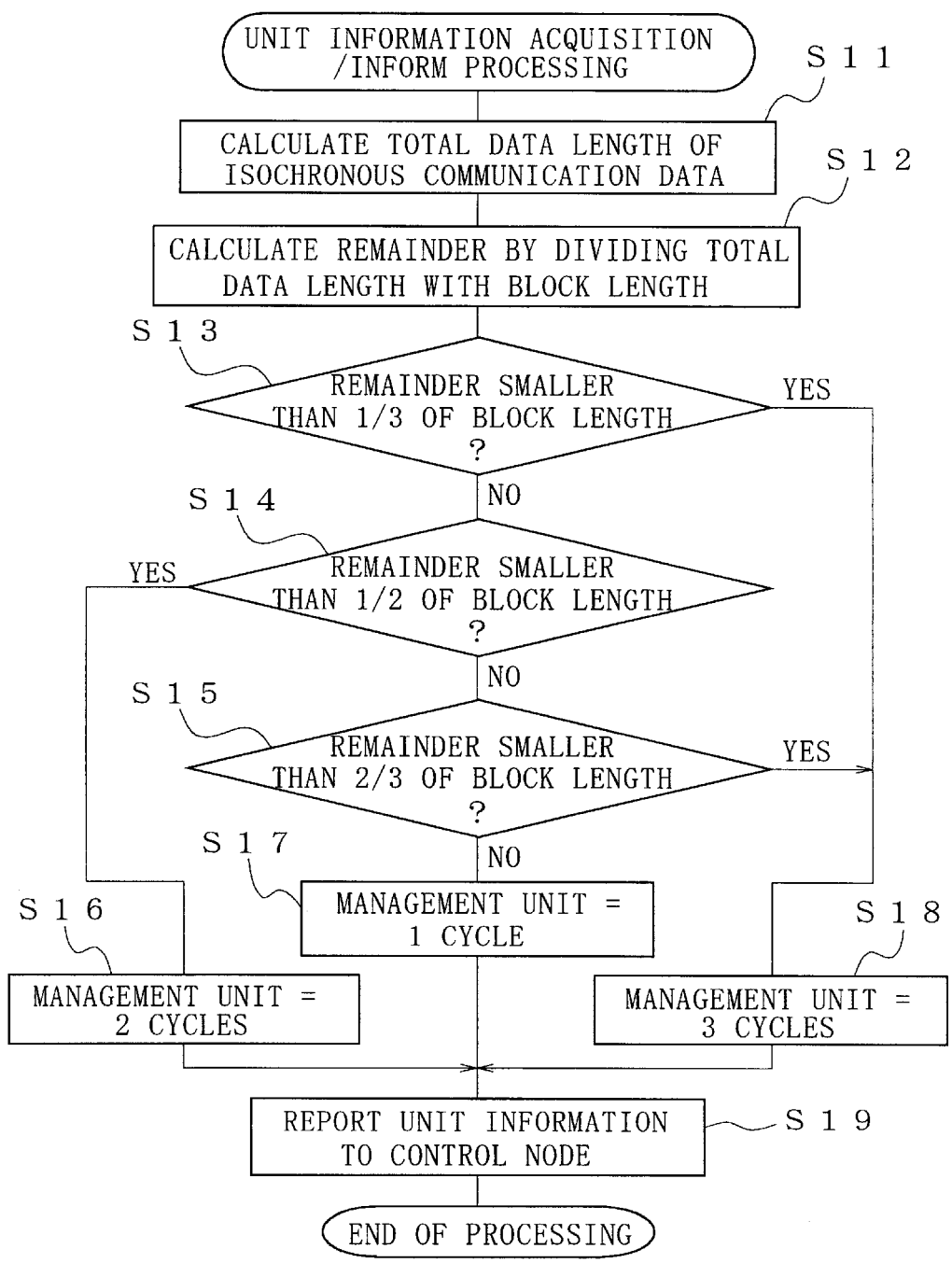
FIG. 14 is a flowchart to which reference will be made in explaining the manner in which each node acquires unit information and inform a control node of the unit information thus acquired.

Each node may acquire the above-mentioned unit information and may inform the control node of the unit information thus obtained in accordance with a flowchart shown in FIG. 14. However, the example shown in the flowchart of FIG. 14 assumes the case in which the maximum unit in which the control node can manage the transmission of isochronous communication data is set to 3 cycles.

Referring to FIG. 14, and following the unit information acquisition/inform processing, control goes to a step S11, whereat there may be calculated a total data length of isochronous communication data transmitted within one cycle. At that very moment, since the header is added to each data block (see FIGS. 6A to 6C) in order to manage individual isochronous packets, data lengths of such headers also may be included in the above-mentioned total data length of isochronous communication data.

Then, control goes to a step S12, whereat a remainder may be calculated by dividing the total data length with the maximum length (block length) of the user data portion of the fixed-length data. Control goes to the next decision step S13, whereat it is determined whether or not the remainder thus calculated is below $\frac{1}{3}$ of the block length. If the calculated remainder is less than $\frac{1}{3}$ of the block length as represented by a YES at the decision step S13, then control goes to a step S18. If on the other hand the remainder is not less than $\frac{1}{3}$ of the block length as represented by a NO at the decision step S13, then control goes to the next decision step S14.

At the step S18, the management unit is set to 3 cycles. Thereafter, control goes to a step S19, whereat such unit information is reported to the control node, whereafter control is ended. It is determined at the decision step S14 whether or not the remainder is smaller than $\frac{1}{2}$ of the block length. If the remainder is smaller than $\frac{1}{2}$ of the block length as represented by a YES at the decision step S14, then control goes a step S16. If on the other hand the remainder is not smaller than $\frac{1}{2}$ of the block length as represented by a NO at the decision step S14, then control goes to the next decision step S15.

At the step S16, the management unit is set to 2 cycles. Thereafter, control goes to the step S19, whereat such unit information is reported to the control node, whereafter control is ended. It is determined at the decision step S15 whether or not the remainder is smaller than $\frac{2}{3}$ of the block length. If the remainder is smaller than the block length as represented by a YES at the decision step S15, then control goes to the step S18. If on the other hand the remainder is not smaller than $\frac{2}{3}$ of the block length as represented by a NO at the decision step S18, then control goes to the step S17.

At the step S18, the management unit is set to 3 cycles. Thereafter, control goes to the step S19, whereat such unit information is reported to the control node. Thereafter, control is ended.

As described above, each node may acquire unit (management unit) information and may inform the control node of the unit information thus acquired. Thus, the transmission of the isochronous communication data of each node may be controlled by the control node at the unit thus notified. In this case, each node may generate data blocks at every unit in which isochronous communication data (isochronous packet) is informed to the control node.

As set forth above, according to the embodiment of the present invention, since the control node may manage the transmission of the isochronous data (isochronous packet) of each node at the unit of 1 to 3 cycles, the portion in which time slots become useless can be reduced, thereby making it possible to improve the transmission efficiency.

As shown in FIG. 13A, for example, when the packets A and B are the isochronous communication data concerning a certain node and the synthesized data length of the packets A and B is 2.4 data blocks, the remainder is greater than $\frac{1}{3}$ of the block length and smaller than $\frac{1}{2}$ so that the management unit may become 2 cycles. Therefore, the transmission of the isochronous communication data concerning a certain node may be managed by the control node at the unit of 2 cycles.

Accordingly, as shown hatched in FIG. 13C, data of the packets A and B may be transmitted by using two time slots in the first cycle and three time slots in the second cycle of two cycles. As described above, in the embodiment of the present invention, since five time slots may be used in each two cycles in order to transmit the data of the packets A and B, the time slots can be used efficiently as compared with the case (see FIG. 13B) in which the transmission of isochronous communication data concerning a certain node is managed at the unit of one cycle, i.e. six time slots are used in each two cycles.

While the maximum management unit of the control node is set to 3 cycles as described above, the maximum management unit of the control node is not limited thereto. Even when the maximum management unit is not set to 3 cycles, the management unit may be set in such a manner that the portion in which the time slots become useless can be minimized (see FIG. 14). Also, when the number of cycles of the management unit is increased and the number of cycles of isochronous communication data managed by each node is increased, the capacities of the RAMs 106, 121 (see FIG. 2) serving as the data buffers should be increased. There is then the disadvantage that a delay amount of data in the transmission and reception processing will be increased unavoidably.

In order that isochronous communication data may be synchronized with each other continuously, the delay amount of isochronous communication data in each cycle should be constant. Therefore, in order to make the management amount (management unit) become variable in somewhere of communication, the data restore unit 122 (see FIG. 2) should delay isochronous communication data not by a delay amount generated from the number of cycles in the actual management unit but by a delay amount generated when delay amounts are managed to the maximum regardless of the management amount in actual practice.

Further, while the isochronous communication data is the IEEE 1394 isochronous packet as described above, the present invention is not limited thereto, and can of course be similarly applied to the case in which other isochronous communication data may be converted into fixed-length data blocks and then transmitted.

Furthermore, while the present invention is applied to the wireless network using infrared rays as a radio communication medium as described above, the present invention is not limited thereto, and can be similarly applied to a wireless network using other radio communication mediums such as radio waves and laser beams.

According to the present invention, in the radio communication method and the radio communication apparatus in which fixed-length data blocks may be transmitted between the nodes by using predetermined slots of a plurality of time slots provided within each consecutive cycle, since the control node manages the transmission of isochronous communication data of each node at the unit of one cycle of a plurality of cycles, the time slot portions which become useless can be reduced, and hence the transmission efficiency can be improved.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A radio communication method of making a communication within a wireless network including one control node and more than one controlled nodes controlled by said control node, said radio communication method comprising the steps of:

performing a communication control process in which said control node controls the transmission of each of said controlled nodes;

transferring a fixed-length data block between each said nodes by using a predetermined time slot of a plurality of time slots provided within each consecutive cycle, wherein said control node manages the transmission of isochronous communication data of each of said controlled nodes at a unit of one of one cycle and a plurality of cycles in accordance with unit information when said transmission control process; and informing said control node of said unit information from each of said controlled nodes, wherein each of said controlled nodes calculates a total data length of isochronous communication data transmitted within one cycle, calculates a remainder by dividing said total data length with a data length of said data block, and acquires said unit information by the remainder.

2. A radio communication apparatus comprising:

one control node; and more than one controlled nodes controlled by said control node and, in which a fixed-data block is transferred between each said controlled nodes by using a predetermined time slot of a plurality of time slots provided within each consecutive cycle, wherein said control node includes transmission management means for managing transmission of isochronous communication data of each of said controlled nodes at a unit of one of one cycle and a plurality of cycles in accordance with unit information, wherein each of said controlled nodes includes:

calculation means for calculating said unit information; and inform means for informing said transmission management means of said unit information calculated by said calculation means, and wherein said calculation means includes means for calculating a total data length of isochronous communication data transmitted within one cycle and a remainder by dividing said total data length with a data length of said data block and for acquiring said unit information using said remainder.

* * * * *